No. 753,453. PATENTED MAR. 1, 1904.
L. F. VOINDROT & L. F. BOILLOT.
FILTER.
APPLICATION FILED DEC. 1, 1902.
NO MODEL.
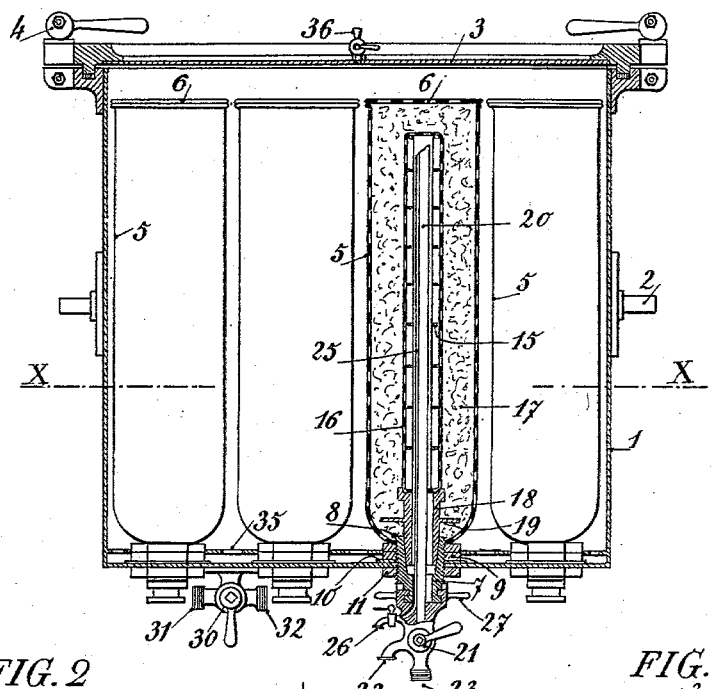
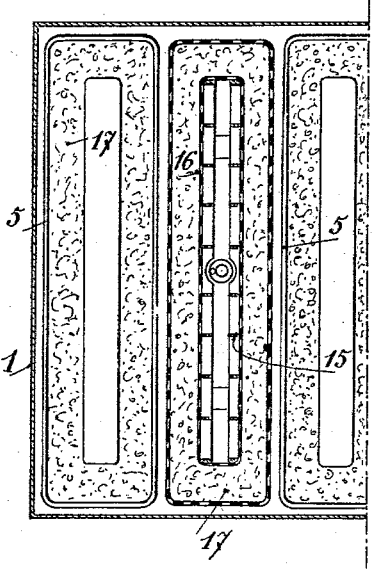
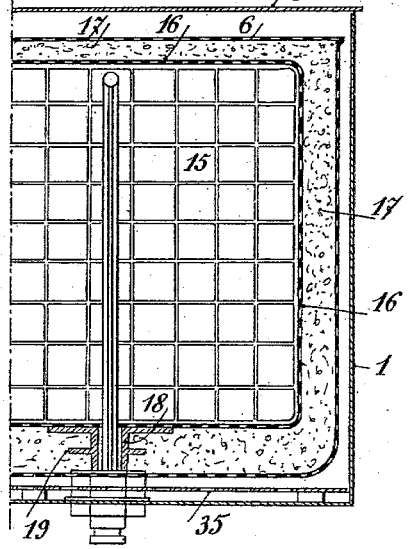
Witnesses
Edwin D. Bartlett
Albert V. Teale
Inventors
Louis Francisque Voindrot
Louis François Boillot
per Herbert Sefton-Jones
Attorney No. 753,453. Patented March 1, 1904.

UNITED STATES PATENT OFFICE.

LOUIS FRANCISQUE VOINDROT, OF CHAGNY, AND LOUIS FRANÇOIS BOILLOT, OF VOLNAY, NEAR POMMARD, FRANCE.

FILTER.

SPECIFICATION forming part of Letters Patent No. 753,453, dated March 1, 1904.

Application filed December 1, 1902. Serial No. 133,457. (No model.)

*To all whom it may concern:*

Be it known that we, LOUIS FRANCISQUE VOINDROT, residing at Chagny, Province of Saône et Loire, and LOUIS FRANÇOIS BOILLOT, residing at Volnay, near Pommard, Province of Côte-d'Or, France, citizens of the Republic of France, have invented a new and useful Improvement in Filters, of which the following is a specification.

The invention relates to a new kind of filter in which the several parts are combined in such a manner as to have practically the largest filtering-surfaces within a given volume, so that a considerable output, together with a perfectly-filtered liquid, may be obtained. This kind of filter is further characterized by arrangements made in order to prevent air-bubbles from remaining inclosed in the filtering material, so that the working may be interrupted without allowing the liquid to produce passages in the interior or on the sides of this material. The new apparatus has besides the advantage that it may be easily mounted, dismounted, and cleaned.

A constructional form of the subject of the present invention is illustrated in the accompanying drawings, in which—

Figure 1 is a vertical section through the casing of the apparatus and through one of the filtering-screens contained therein. An outlet tube and cock is shown in section attached to one of the filtering-screens only; but it is to be understood that similar tubes and cocks are connected to each filter-screen. Fig. 2 is a part of a section on line X X of Fig. 1, only one of the filtering-screens being shown in detail in section. Fig. 3 is a part of a section of the apparatus taken at right angles to the view shown in Fig. 1 and passing centrally through one of the filtering-screens.

The filter comprises a square casing 1, resting on a suitable support by means of journals 2, so that it may be rocked. The casing is closed by a cover 3, fixed by a suitable number of cam-levers 4 and provided with an air-outlet cock 36. Four screens 5, of perforated sheet metal, are disposed in the interior of the casing, the perforations being arranged in the bottoms as well as in the four sides. Each screen is closed at its top by a cover 6, also made from perforated sheet metal. The bottoms of the screens have a semicylindrical shape, the purpose of which will be hereinafter explained. Each screen carries in the middle of its bottom a tube 7, passing through the bottom of the casing 1 and in which the outlet-pipe of the filtered liquid is inserted. This tube is fastened on the bottom of the screen by a ring 8 and pressed downward by a nut and a lock-nut 9. The tube is fixed on the bottom of the casing 1 by a lock-nut with an interposed gasket 10, and a nut 11 fixes it from below.

A squared frame 15, surrounded by wire-gauze 16, with very fine meshes, is contained in the interior of every screen, such as 5. The liquid filters through a layer of asbestos-paste 17, which surrounds the whole frame and enters into the interior of the frame through the wire-gauze. Each frame 15 is provided with a tube 18 in the middle of its bottom, the tube ending in a cone and being provided with a ring 19. The conical part of the tube 18 serves for the engagement and establishes a tight joint in the tube 7. A tube 20 is introduced in the interior of the frame 15, the said tube being beveled on its upper end, which reaches to the top of the frame and terminates on its lower end by a cock 21. This cock is provided with an outlet-pipe 22 and a pipe 23, connected with the pump which supplies the filtered liquid to the vessels or containers intended to receive it. Joined laterally with the tube 20 there is another little pipe 25, terminating in a separate cock 26, for taking samples of the filtered liquid. The cock 21 is fixed, besides, on the tube 7 from below by a bayonet-catch 27. A three-way cock 30 is provided on the bottom of the casing 1. A tube 31 serves for the admission of the liquid to be filtered and a tube 32 for the outlet.

A perforated double bottom 35 is arranged in the casing 1 a little beneath the bottoms of the screens 5, and it is provided at the places where the tubes 7 pass with holes which are sufficiently large for engaging and disengaging the said tubes. This double bottom serves to break the current of the liquid to be filtered entering the casing and to prevent this liquid from striking directly against the perforated walls of the screens and displacing the filtering material.

From the adopted arrangements the following advantages result: The square form of the casing in which screens of a small thickness in relation to their breadth and height are arranged allows very large filtering-surfaces in a volume as restricted as possible. The screens are arranged in such a manner that their whole surfaces may be utilized for the filtration. They can easily be mounted and dismounted, all the parts can be cleaned and sterilized, and one easily can separate them in case one of them should work badly. As a sample we have illustrated a casing containing four screens; but we do not limit ourselves to a special number, and we can vary this number in accordance with the purposes of the filter. The admission of the liquid into the casing is effected from below in such a manner that the liquid penetrates slowly and without disintegrating the filtering material.

The bottom of the screens 5 are made semicylindrical, so that the filtering material will completely fill the bottoms where it settles of its own accord. If the filter-screens had horizontal bottoms with rectangular corners, the filtering material might not settle closely under the frames 15 when the space between the screens and frames was filled and the liquid might enter the frames through the spaces thus left without properly traversing the filtering material. By the rounding of the bottoms of the screens, however, the material is deflected inward until the space beneath the frames is properly filled.

The pipe 18, provided on the bottom of each frame 15, terminates in a cone and is easily slid in the tube 7. Thereby the frame 15 can easily be put in place or removed for cleansing purposes. The ring 19, provided on the tube 18, prevents the liquid from penetrating between the wall of the said tube and the filtering material and from entering easily into the frame 15 without traversing partly the filtering material. The ring 19 bars its way and prevents the liquid from producing passages or channels through the filtering material. The arrangement of the pipe 20, opening into the top of the frame 15, allows the air inclosed in the frame to escape, the air being driven back to the top when the liquid rises in the casing at the beginning of the operation. It prevents the accumulation of air and the pressure resulting therefrom, which could cause the filtering-cloth to burst.

The small pipe 25, joined to the tube 20, allows samples to be taken from each screen during the working, and it indicates whether a screen should be separated by closing the cock 21.

What we claim is—

1. In a filter the combination with a casing, of a plurality of perforated screens therein, a frame within each screen and a covering of gauze over each frame, filtering material in each screen in the space between said gauze-covered frame and the screen, and an outlet-tube passing up within said frame to the top thereof, substantially as hereinbefore described.

2. In a filter the combination with a casing, of a plurality of perforated screens therein, a frame within each screen and a covering of gauze over each frame, filtering material in each screen in the space between said screen and the gauze-covered frame, a tube at the bottom of each screen, a tube at the bottom of each frame adapted to enter said first-mentioned tube, and a ring on the second-mentioned tube within the screen, substantially as and for the object set forth.

3. In a filter the combination with a casing, of a plurality of perforated screens therein, each screen of semicylindrical form at the bottom, a frame within each screen and a covering of gauze over each frame, filtering material in each screen in the space between said screen and the gauze-covered frame, and an outlet-tube passing through said screen into the interior of said frame.

4. In a filter the combination with a casing, of a plurality of perforated screens therein, a frame within each screen and a covering of gauze over each frame, filtering material in each screen in the space between said screen and the gauze-covered frame, a tube at the bottom of each screen and a second tube at the bottom of each frame adapted to fit in the first tube, and an outlet-tube passing through said first and second tubes to the top of each frame within the latter, substantially as hereinbefore set forth.

In testimony whereof we have signed our names to this specification in the presence of two subscribing witnesses.

LOUIS FRANCISQUE VOINDROT.
LOUIS FRANÇOIS BOILLOT.

Witnesses:
AUGUSTE FOURNOL,
EDWARD P. MACLEAN.